Oct. 3, 1961     M. B. HEFTLER     3,002,405
CUTTING TOOLS
Filed April 17, 1958

INVENTOR.
Maurice Ben Heftler

United States Patent Office 3,002,405
Patented Oct. 3, 1961

3,002,405
CUTTING TOOLS
Maurice Ben Heftler, 1119 Harvard Road,
Grosse Pointe Park, Mich.
Filed Apr. 17, 1958, Ser. No. 729,195
2 Claims. (Cl. 77—58)

This invention is for an improved form of internal cutting lathe tool or boring bar in which the cutting is done by a separable piece or bit rigidly clamped in the bar.

In previous tool of this type, the bit and bar, of given geometry, provided for but one angle between the cutting face of the bit and its direction of travel through the work, or the bit was held in a quill which could be rotated in the bar to change the cutting angle. The use of a quill imposes a serious loss of strength and rigidity in the bar. The only way of sharpening the usual tool bit when a different cutting angle than provided by the geometry is required is to grind on the face of the bit. This is not only difficult to accomplish with any degree of precision and repeatability; it is also very wasteful of expensive material.

In this invention, I provide a bit whose cutting face extending the full length of the bit, and finish ground, is at an angle other than perpendicular to the direction in which the bit is located and clamped in the bar. When the bit is placed in the bar, its cutting face will make a given angle with its direction of travel through the work. This angle is determined by the geometry of the bit and bar and it can be reproduced with great precision. If the bit is turned end for end in the bar this angle is changed by a precise amount, again determined by the geometry and precisely reproducible. The user thus has, with only one bar and only one bit, a choice of two cutting angles, each determinable and precise. He need only grind away the end of the bit where it would interfere with the cutting action, and to remove wear, thus providing relief and clearance angles, which are not very critical. With one more bit, different from the first, he has two more cutting angles. With only four bits the whole range of cutting angles required by the widest diversity of work is provided, from minus 5° to 30° in steps of 5°.

Figure 1:
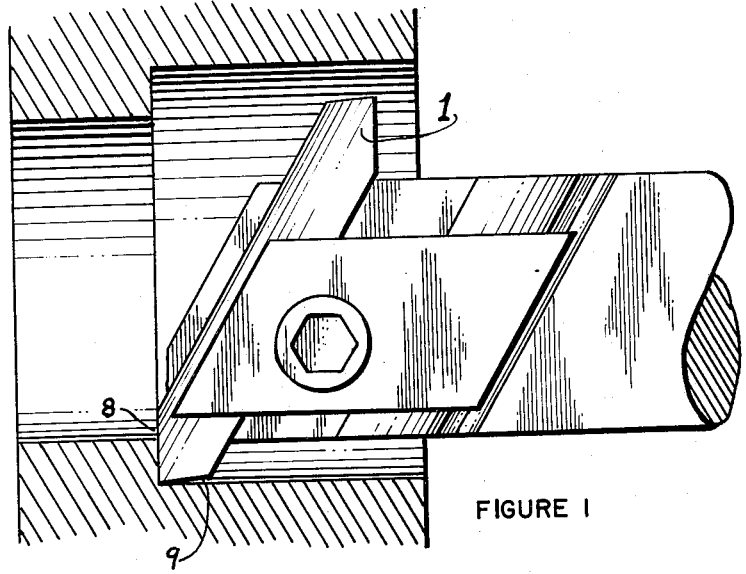
FIGURE 1 shows a boring bar made according to this invention. The view is from above, with the bar as it normally would be positioned in a lathe.

The bit 1 had two faces 2 and 3, at an angle to each other, by which it is located and clamped in a groove or slot cut into the bar, which slot has two sides 4 and 5, at the same angle to each other as the faces 2 and 3 of the bit. The bit is locked in place by the clamp 6 bearing against its third face 7. The three major faces of the bit 2, 3 and 7 extend the full length of the bit, and each of the three faces are plane surfaces with two parallel sides. Each of these three faces are parallel to the major axis of the bit, and the cross-section of the bit is that of a prism.

The angle between faces 3 and 7 is greater than the angle between faces 2 and 7. As the bit is pushed into place by the clamp, it moves parallel to the plane a—a that bisects the angle between the sides 4 and 5 of the groove in the bar. This central or locating plane is at an angle other than 90° to the third face 7 of the bit.

Figure 2:
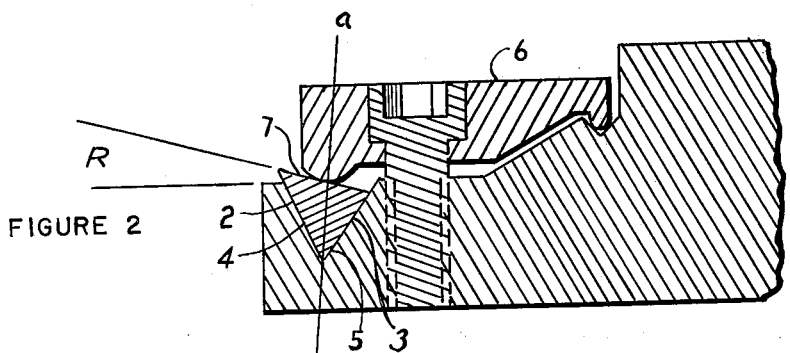
FIGURE 2 is a longitudinal vertical section of the same bar, taken through the clamping screw.
Figure 3:
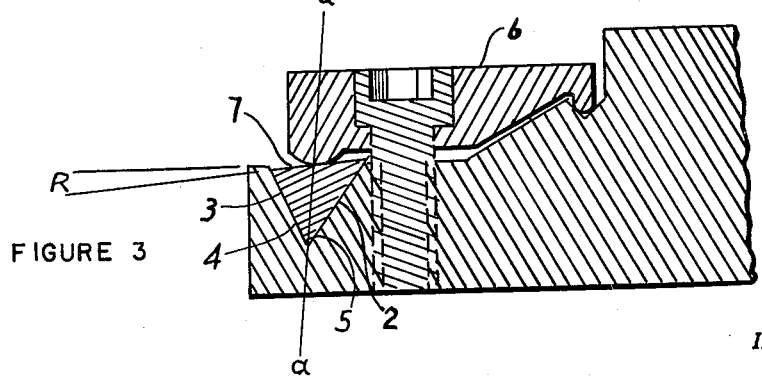
FIGURE 3 is identical to FIGURE 2 except that the bit has been turned end for end in the bar.

Face 7 is the cutting face of the bit. The angle it makes with the perpendicular to its direction of travel through the work, shown as R, is called the cutting angle or rake angle. If the sharp angle between faces 2 and 7 of the bit is to the left, as in FIGURE 2, angle R is large. If it is to the right, as in FIGURE 3, angle R is smaller, or even negative, as in the case shown. It can easily be seen that the rake angle, or cutting angle, R can be changed simply by turning the bit end for end in the bar, except for the limiting case, which is old in the art, in which face 7 makes equal angles with faces 2 and 3, in which case R does not change. In this invention where face 7 makes different angles with faces 2 and 3, even a slight difference in angle will give a change in cutting angle R as the bit is turned end for end. The plane a—a is inclined relative to the direction of travel of the bit through the work so that the various cutting angles R available with a few bits will all be useful for cutting various substances, and none too extreme to be practical.

In practice, the plane a—a midway between the sides 4 and 5 of the groove in the bar would be inclined some 10° to 15° so that a bit of proportions shown would produce rake angles of minus 5° and 30°. Other bits of more nearly equilateral section would produce angles of, say, 0° and 25°, 5° and 20°, or 10° and 15°.

The face 7 of the bit is never sharpened by the user. It is finish ground when purchased. Only the end of the bit is sharpened, to produce the cutting edge 8, at the desired angle and with adequate clearance, and to produce the side relief 9 with clearance. The end of the bit is likewise ground to remove wear, and it only need be ground enough to remove wear. No material is wasted, as invariably results when the face of the bit is ground to produce the desired rake angle.

Although grinding to produce 8 and 9 is not difficult, nor critical, it is best accomplished on the surface grinder by gripping the bit in a specially prepared block or fixture. Such a fixture can be used for the entire series of bits for a given bar. The surfaces produced will be in fixed geometrical relationship to the sides 2 and 3 of the bit, as they should be. They will be independent of the angle of the cutting face 7.

This invention provides the machinist with a choice of rake angles, two for each type of bit, easy and reproducible sharpening, and minimum cost for boring bars and bits.

I claim the following:
1. A boring bar having an elongated open transverse V-shaped groove therein, said groove having a forward and a rear wall, the longitudinal axis of said groove being slightly inclined to a plane normal to the longitudinal axis of said bar, a bit having the cross section of a scalene triangle mounted within said V-shaped groove, two surfaces of said bit intersecting at the same angle as said forward and rear walls of said V-shaped groove, said bit being indexible from a first position to a second position by transposing said bit end for end to thereby change the rake angle of said bit and clamping means mounted upon said bar in engagement with a third surface of said bit.

2. A boring bar having an elongated transverse V-shaped groove therein, said groove having a forward wall and a rear wall, a bit having the cross section of a scalene triangle mounted within said V-shaped groove, two surfaces of said bit intersecting at the same angle as said forward and rear walls of said V-shaped groove, said bit being indexible from a first position to a second position by transposing said bit end for end to thereby change the rake angle of said bit, and clamping means mounted on said bar in engagement with a third surface of said bit.

References Cited in the file of this patent
UNITED STATES PATENTS

| | | |
|---|---|---|
| 1,387,417 | Lennon | Aug. 9, 1921 |
| 2,310,992 | Proska | Feb. 16, 1943 |

FOREIGN PATENTS

| | | |
|---|---|---|
| 543,822 | Great Britain | Mar. 13, 1942 |